United States Patent [19]

Zulaski et al.

[11] Patent Number: 5,170,311
[45] Date of Patent: Dec. 8, 1992

[54] OVERCURRENT PROTECTION DEVICE

[75] Inventors: John A. Zulaski, Mt. Prospect; Brian P. Mugalian, Evanston, both of Ill.

[73] Assignee: S&C Electric Company, Chicago, Ill.

[21] Appl. No.: 457,632

[22] Filed: Dec. 27, 1989

[51] Int. Cl.$^5$ .............................................. H02H 3/08
[52] U.S. Cl. ................................ 361/94; 361/79; 361/87
[58] Field of Search ................... 361/3, 94, 87, 79, 59, 361/93

[56] References Cited
U.S. PATENT DOCUMENTS
4,445,183 4/1984 McCollum et al. ..................... 361/3

Primary Examiner—Todd E. DeBoer
Attorney, Agent, or Firm—James V. Lapacek

[57] ABSTRACT

An overcurrent protection device is provided for one or more phases of a circuit that generates a control signal dependent upon an adjustable trip level setting after a fault has occurred. The device includes a blocking level detector that blocks the generation of the control signal is the current in any of the phases exceeds either a first predetermined blocking level or the adjustable trip level setting. In a preferred arrangement, before control-signal generation, the device also requires that the current in at least one phase is below a predetermined load level.

13 Claims, 2 Drawing Sheets

OVERCURRENT PROTECTION DEVICE

BACKGROUND OF THE INVENTION

1. Field of the Invention

The present invention relates generally to the field of overcurrent protection devices for poly-phase circuits and more particularly to a device that generates a control signal after the occurrence of a fault, provided that at the time of control-signal generation the current in at least one phase is below a predetermined load level and the current in all phases is below both a fixed blocking level and an adjustable trip level.

Various overcurrent protection devices generate trip signals in response to predetermined overcurrent conditions in poly-phase electrical circuits. One specific device of this type is the S&C Overcurrent Relay Type ZSD which is described in Photo Sheet 551.700 (Apr. 11, 1988) of S&C Electric Company, Chicago, Ill. This device is utilized to trip a switch operator to open an interrupter switch to achieve poly-phase isolation of the circuit after a fault has been cleared. This feature is accomplished by monitoring the current in each phase of the circuit and comparing the monitored current with a field-adjustable trip level setting in the range of 400 to 2400 amperes. If the current in any phase exceeds the level detector setting for a predetermined time period (to eliminate response to transient disturbances), the device starts a field-adjustable tripping circuit timer. If current above a specified level returns on all phases before the timer times out, the device is automatically reset. If such current does not return on all phases (as will be the case when a fault is cleared), when the timer times out, a trip signal will be generated to activate the switch operator—thus opening the interrupter switch. A blocking circuit is employed which inhibits the generation of the trip signal in the event that the timer has timed out but the over-current has not yet been successfully cleared.

While this device is generally suitable for a variety of application, in other applications, the trip level setting may be set below the 600-ampere blocking level setting; e.g., the trip level setting may be in the range of 400-600 amperes. Thus,. there could be situations where a fault in the range of 400-600 amperes would still be present and the associated load-break switch would be asked to interrupt the fault current—a duty for which it is not designed. To alleviate this situation, the fixed blocking level could be lowered to 400 amperes or the minimum trip level setting could be raised to 600 amperes. However, this is not entirely satisfactory since those levels are different to satisfy legitimate load circuit concerns and to give a greater range of selective control.

SUMMARY OF THE INVENTION

Accordingly, it is a principal object of the present invention to provide an overcurrent protection device for a poly-phase circuit that generates a control signal after a fault has occurred, provided that at the time of control-signal generation the current in all phases is below both a first predetermined level and a second adjustable level.

It is another object of the present invention to provide an overcurrent protection device that provides a blocking function that responds to adjustable trip-level settings of the device.

These and other objects of the present invention are efficiently achieved by an overcurrent protection device for one or more phases of a circuit that generates a control signal dependent upon an adjustable trip level setting after a fault has occurred. The device includes a blocking level detector that blocks the generation of the control signal if the current in any of the phases exceeds either a first predetermined blocking level or the adjustable trip level setting. In a preferred arrangement, before control-signal generation, the device also requires that the current in at least one phase is below a predetermined load level.

BRIEF DESCRIPTION OF THE DRAWING

The invention, both as to its organization and method of operation, together with further objects and advantages thereof, will best be understood by reference to the specification taken in conjunction with the accompanying drawing in which.

DETAILED DESCRIPTION

Figure 1:
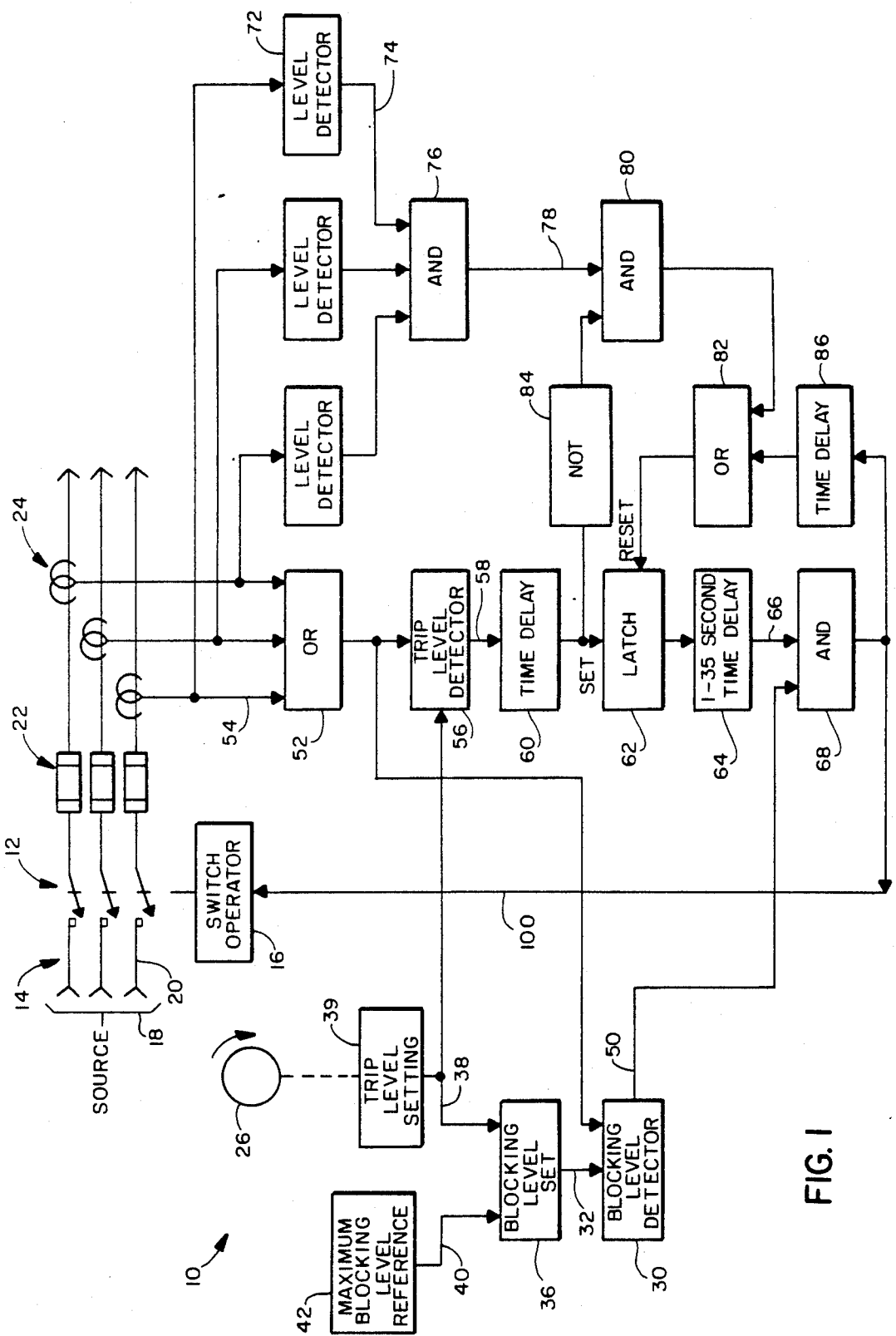
FIG. 1 is a block diagram of the overcurrent protection device of the present invention.

Referring to FIG. 1, the present invention in one specific application relates to an overcurrent protection device 10 which effects selective operation of interrupter switches 12 in a poly-phase electric circuit 14 via a switch operator 16. The circuit 14 includes a source of electrical power, not shown but generally indicated at 18; the source 18 being connected to the poly-phase conductors 20 comprising the circuit 14. Fuses are provided in each of the phases downstream of the switches 12. In an illustrative application, the configuration of FIG. 1 is a load-feeder bay of switchgear. Current sensors 24 are provided on the load side of the fuses 22.

Via the current sensors 24, the overcurrent protection device 10 monitors the current in each phase and compares each of the monitored currents with an adjustable trip level setting which is set via the control 26. If the current in any phase exceeds the trip level setting for a predetermined time period (to eliminate response to transient disturbances), a tripping circuit timer is activated. If normal load current returns on all phases before the tripping circuit timer times out (e.g., as would be the case with transformer inrush), the overcurrent protection device 10 will be reset. But if normal load current does not return on all phases when the tripping circuit timer times out, a trip signal will be generated at 100 to activate the switch operator 16 opening the interrupter switches 12. It should be realized that in other applications, the signal at 100 can be characterized as a control signal to perform functions other than tripping.

Additionally, the device 10 blocks (inhibits) the generation of the trip signal at 100 if the overcurrent exceeds either the adjustable trip level setting or a predetermined blocking level. The trip signal will be generated when the current subsequently falls below the lower of either the trip level setting or the predetermined blocking level.

In an illustrative example, if the trip level is set in the range of 400-600 amperes (e.g. 400A) and the blocking level is 600 amperes, the device 10 will block generation of the trip signal at 100 if the overcurrent exceeds the trip level setting (e.g., 400A). On the other hand, if the trip level setting is above 600 amperes, then generation of the trip signal will be blocked if the overcurrent exceeds 600 amperes.

Figure 3:
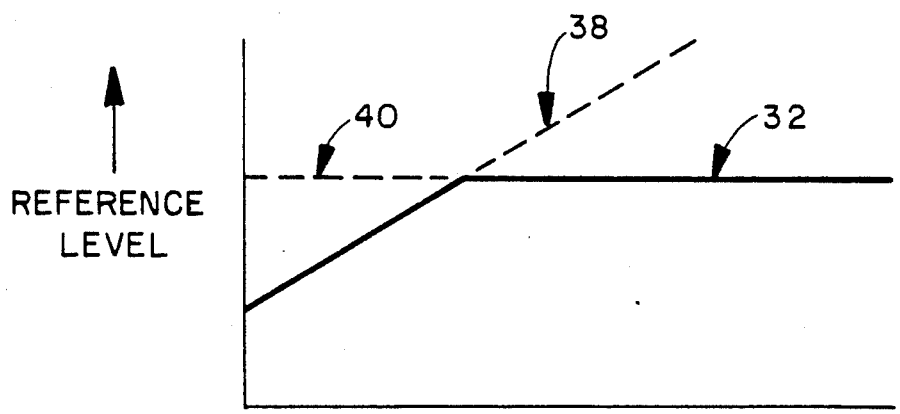
FIG. 3 is a diagrammatic representation of signal levels in the overcurrent protection device of FIGS. 1 and 2.

Considering now the details of the overcurrent protection device 10 to achieve the aforementioned features and operation, the device 10 includes a blocking level detector 30. The blocking level detector 30 includes a reference input at 32 and a sensed current input at 34 which are compared by the blocking level detector 30. The reference input 32 is provided at the output of a blocking level set stage 36. The blocking level set stage 36 includes a trip level setting input at 38 which is derived from a trip level setting stage 39 and the trip level setting control 26. The blocking level set stage 36 also includes a predetermined blocking level input 40 from a maximum blocking level reference stage 42. The input 40 corresponds to the maximum blocking level, for example, 600 amperes, while the trip level setting input 36 is in the range of 400 to 2400 amperes in an illustrative example. With additional reference to FIG. 3, the blocking level set stage 36 at output 32 provides a signal to the blocking level detector 30 that corresponds to the lower of the two input reference levels at 38,40.

Accordingly, the blocking level detector 30 compares the sensed current at 34 with the signal at 32 such that a blocking signal is output at 50 whenever the sensed current at 34 exceeds either the maximum blocking reference at 40 or the trip level setting at 38.

The sensed current signal 34 is provided at the output of an "OR" detector stage 52. The stage 52 receives sensed current signals at 54 from the current sensor 24 for each of the phases and is operative to provide at the output 34 a signal representing the largest sensed current in any of the phases. The sensed current output at 34 is also connected to a trip level detector 56 that compares the sensed current signal at 34 with the trip level setting signal at 38. If the signal at 34 is greater than the signal at 38, the trip level detector 56 generates an output at 58.

Via a time delay stage 60 (which is provided to avoid response to transient disturbances), a latch 62, and an adjustable timer 64, a signal is generated at 66 as one input to an "AND" stage 68. A second input to the "AND" stage 68 is the output 50 of the blocking level detector 30. The "AND" 68 stage function as an "AND" to generate a trip signal at 100 if the blocking signal output at 50 corresponds to a non-blocking condition and the timer times out and provides an enabling signal at 66. As discussed hereinbefore, when the trip signal is generated at 100, the switch operator 16 is actuated to open the interrupter switches 12. Of course, if the signal at 66 is enabling but the blocking signal output at 50 corresponds to a blocking state, the trip signal at 100 is inhibited until the blocking conditions cease.

Also depicted in FIG. 1 are normal load current detectors 72 for each phase which are responsive to the current sensors 24. The current detectors 72 output at 74 a signal indicative of whether or not the current in the respective phase is above a predetermined normal current level—e.g., 3.5 amperes in an illustrative example. The signals 74 are connected to an "AND" stage 76 which generates an output at 78 when the current in all the phases satisfies the normal current levels. The input 78 functions with the stages 80,82 and 84 to provide a reset function as described hereinbefore if normal load current returns in all phases before the timer 64 times out. If normal load current does not return in all phases before the timer 64 times out, the device 10 is not reset and the trip signal is generated at 100, provided the blocking conditions are not active. The timer 86 provides a path for resetting of the device 10 after generation of a trip signal at 100.

Figure 2:
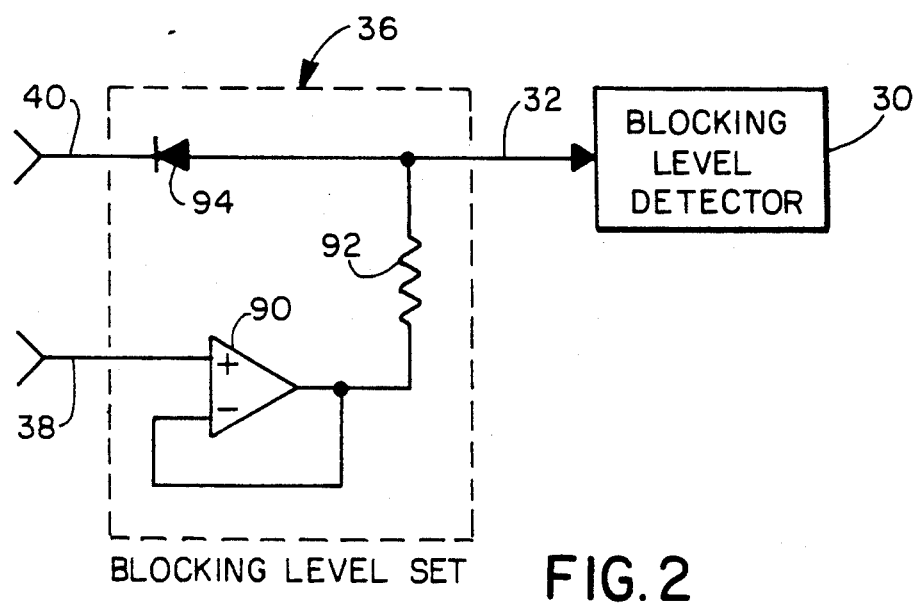
FIG. 2 is a schematic diagram of a portion of the device of FIG. 1.

Referring now to FIG. 2, a specific illustrative embodiment of the blocking level set stage 36 is depicted. The trip level setting signal 38 is connected to the non-inverting input of an operational amplifier 90 configured as a voltage follower. The output of the operational amplifier 90 is connected through a resistor 92 to provide the reference input 32 of the blocking level set stage 36. The maximum blocking reference signal 40 is connected through a diode 94, cathode to anode, to the output 32. Thus, with additional reference to FIG. 3, it can be seen that if the trip level setting signal at 38 is lower than the maximum blocking signal at 40, the output 32 follows or tracks the trip level signal at 38. When the trip level signal at 38 is greater than the maximum blocking level signal at 40, the diode 94 conducts to clamp the signal at 32 to correspond to the desired maximum blocking level. A diode 94 can be utilized that has a very low voltage drop or the signal at 40 can be offset to provide the precise level at 32 accounting for the diode voltage drop.

While there have been illustrated and described various embodiments of the present invention, it will be apparent that various changes and modifications will occur to those skilled in the art. For example, in another specific embodiment, instead of the circuit of FIG. 2, a function generator or microprocessor can be utilized to perform the function of the blocking level set stage 36. It is intended in the appended claims to cover all such changes and modifications as fall within the true spirit and scope of the present invention. Additionally, it should be understood that the foregoing description is to be construed as illustrative and not in any limiting sense.

What is claimed and desired to be secured by Letters Patent of the United States is:

1. In a device responsive to an adjustable level input and a fixed blocking level input that generates a control signal after the occurrence of current in one or more liens exceeding an adjustable level setting on the adjustable level input, the adjustable level input being adjustable in a range that includes current levels both lower and higher than the predetermined blocking level, the device including an arrangement that blocks the generation of the control signal when the current in any of the one or more lines exceeds a predetermined blocking level on the blocking level input, wherein the improvement comprises:

blocking means responsive to the adjustable level input and the fixed blocking level input for blocking the generation of the control signal whenever the current in at least one of the lines is greater than or equal to the lower of the adjustable level setting on the adjustable level input or the predetermined blocking level on the blocking level input.

2. The device of claim 1 further comprising load-current means for determining that the current in at least one of the lines is below a predetermined load level before generation of the control signal.

3. The device of claim 2 further comprising time-delay means for delaying the generation of the control signal for a predetermined time interval after the occurrence of a current exceeding the adjustable level setting.

4. In an overcurrent protection device that generates a control signal in response to predetermined conditions, the combination of an adjustable level input, a blocking level input, and means for blocking the control signal whenever the current is above either a predetermined blocking level on said blocking level input or an adjustable current level on said adjustable level input, said adjustable current level being adjustable over a range of current levels including levels less than and greater than said predetermined blocking level.

5. A control device for poly-phase electrical circuits comprising:
   a blocking level input that establishes a predetermined blocking level;
   an adjustable level input that establishes an adjustable predetermined level that is adjustable over a range including current levels less than and greater than said predetermined blocking level;
   level detecting means responsive to the current in the poly-phase electrical current for generating a first signal when the current in any of the phases exceeds said adjustable predetermined level on said adjustable level input;
   load-current determining means for determining whether or not the current in each of the phases is above a minimum predetermined level; and
   control-signal generation means responsive to said load current determining means and said level detecting means for generating a control signal after the occurrence of said first signal and when current above said minimum predetermined level is not present in at least one of the phases, said control signal generating means including blocking means being responsive to said adjustable level input and said blocking level input for blocking said control signal whenever the current in any of the phases exceeds either said predetermined blocking level on said blocking level input or said adjustable predetermined level on said adjustable level input.

6. The control device of claim 5 wherein said control-signal generation means further comprises means for delaying the generation of said control signal for a predetermined time interval after the occurrence of said first signal.

7. The control device of claim 6 wherein said control-signal generation means further comprises resetting means for resetting said control-signal generation means during said predetermined time interval if current above said minimum predetermined level is present in all of the phases.

8. The combination of a blocking level input that establishes a first level, an adjustable level input that establishes a second adjustable level that is adjustable in a range that includes levels both lower and higher than said first level on said blocking level input, and a control device that generates a control signal in response to predetermined conditions provided that the current in one or more lines is below both said first level on said blocking level input and said second adjustable level on said adjustable level input.

9. In a device having an adjustable level input and a blocking level input that generates a control signal after the occurrence of current in one or more lines exceeding an adjustable level setting on the adjustable level input, the device including an arrangement that blocks the generation of the control signal when the current in any of the one or more lines exceeds a predetermined blocking level on the blocking level input, wherein the improvement comprises:
   blocking means for generating a blocking signal to block the generation of the control signal whenever the current in at least one of the lines is greater than or equal to the lower of either the adjustable level setting on the adjustable level input or the predetermined blocking level on the blocking level input, said blocking means comprising means responsive to the adjustable level input and the blocking level input for outputting a blocking reference signal that corresponds to the lower of the adjustable level input or the fixed blocking level input.

10. The device of claim 9 wherein said blocking reference signal outputting means comprises a diode having an cathode connected to a first reference level and an anode providing said blocking reference signal, said first reference level establishing said blocking level input, said blocking reference signal outputting means further comprising an operational amplifier connected as a voltage follower and having a second reference level connected to a non-inverting input of said operational amplifier, said operational amplifier having an output, said blocking reference signal outputting means further comprising a resistor connected between said output of said operational amplifier and said anode of said diode, said second reference level establishing the adjustable level input.

11. The device of claim 9 wherein said blocking means further comprises means for comparing said blocking reference signal to the highest current in any of the one or more lines.

12. The device of claim 11 wherein said device further comprises trip level comparator means for comparing the adjustable level input to the highest current in any of the one or more lines.

13. In a device having an adjustable level input and a blocking level input that generates a control signal after the occurrence of current in one or more lines exceeding an adjustable level setting on the adjustable level input, the device including an arrangement that blocks the generation of the control signal when the current in any of the one or more lines exceeds a predetermined blocking level on the blocking level input, wherein the improvement comprises:
   blocking means for generating a blocking signal to block the generation of the control signal whenever the current in at least one of the lines is greater than or equal to the lower of either the adjustable level setting on the adjustable level input or the predetermined blocking level on the blocking level input, said blocking means comprising means responsive to the adjustable level input and the fixed blocking level input for outputting a blocking reference signal that corresponds to the level of the adjustable level setting up to the level of the predetermined blocking level and for outputting said blocking reference signal corresponding to the level of the predetermined blocking level when the adjustable level setting is higher than the predetermined blocking level.

* * * * *